No. 755,849. PATENTED MAR. 29, 1904.
L. H. COLBURN.
VERTICAL SHAPER.
APPLICATION FILED JULY 29, 1902.
NO MODEL. 6 SHEETS—SHEET 5.
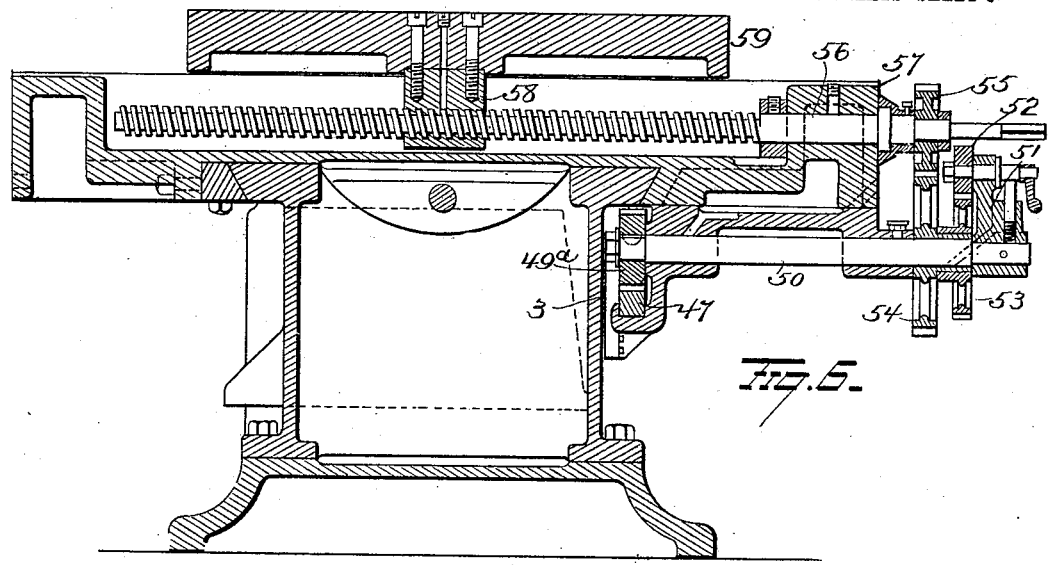
FIG. 6.
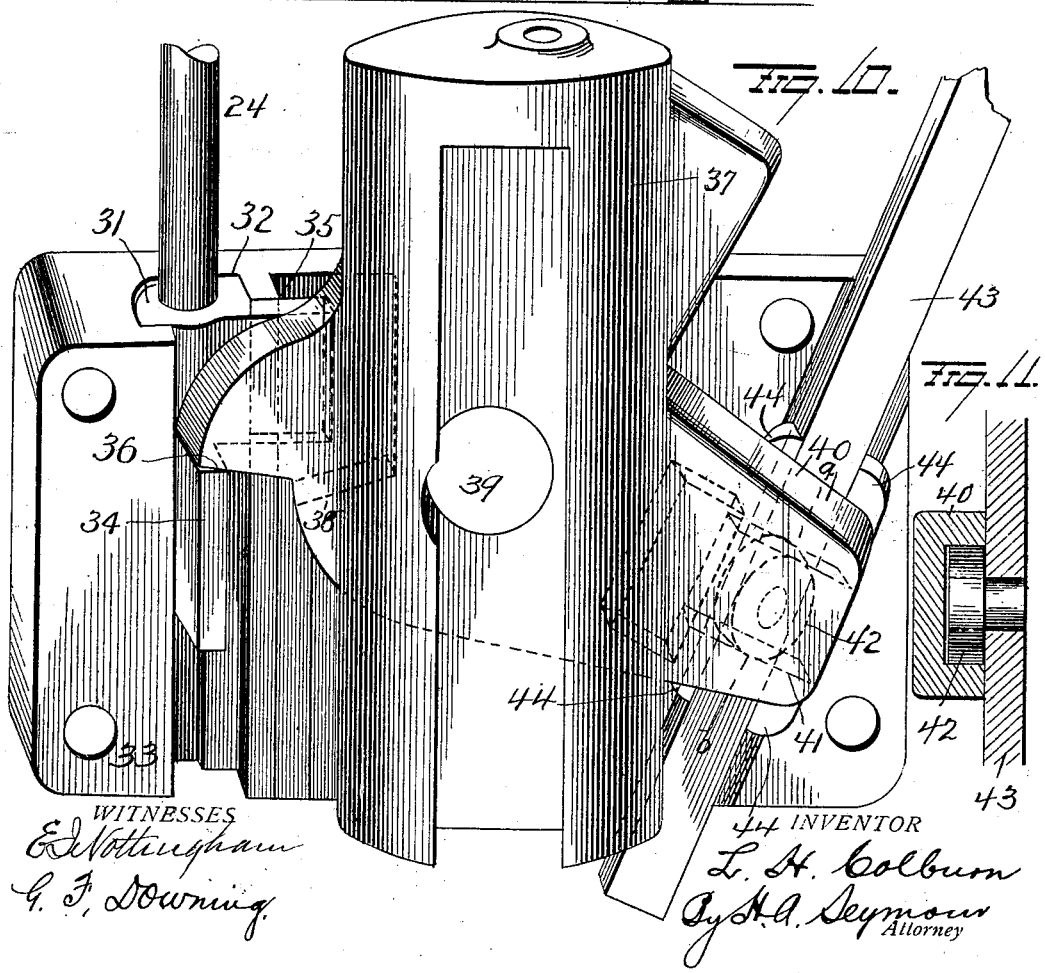
FIG. 10.
FIG. 11.
WITNESSES
INVENTOR
L. H. Colburn
Attorney No. 755,849. PATENTED MAR. 29, 1904.
L. H. COLBURN.
VERTICAL SHAPER.
APPLICATION FILED JULY 29, 1902.
NO MODEL. 6 SHEETS—SHEET 6.
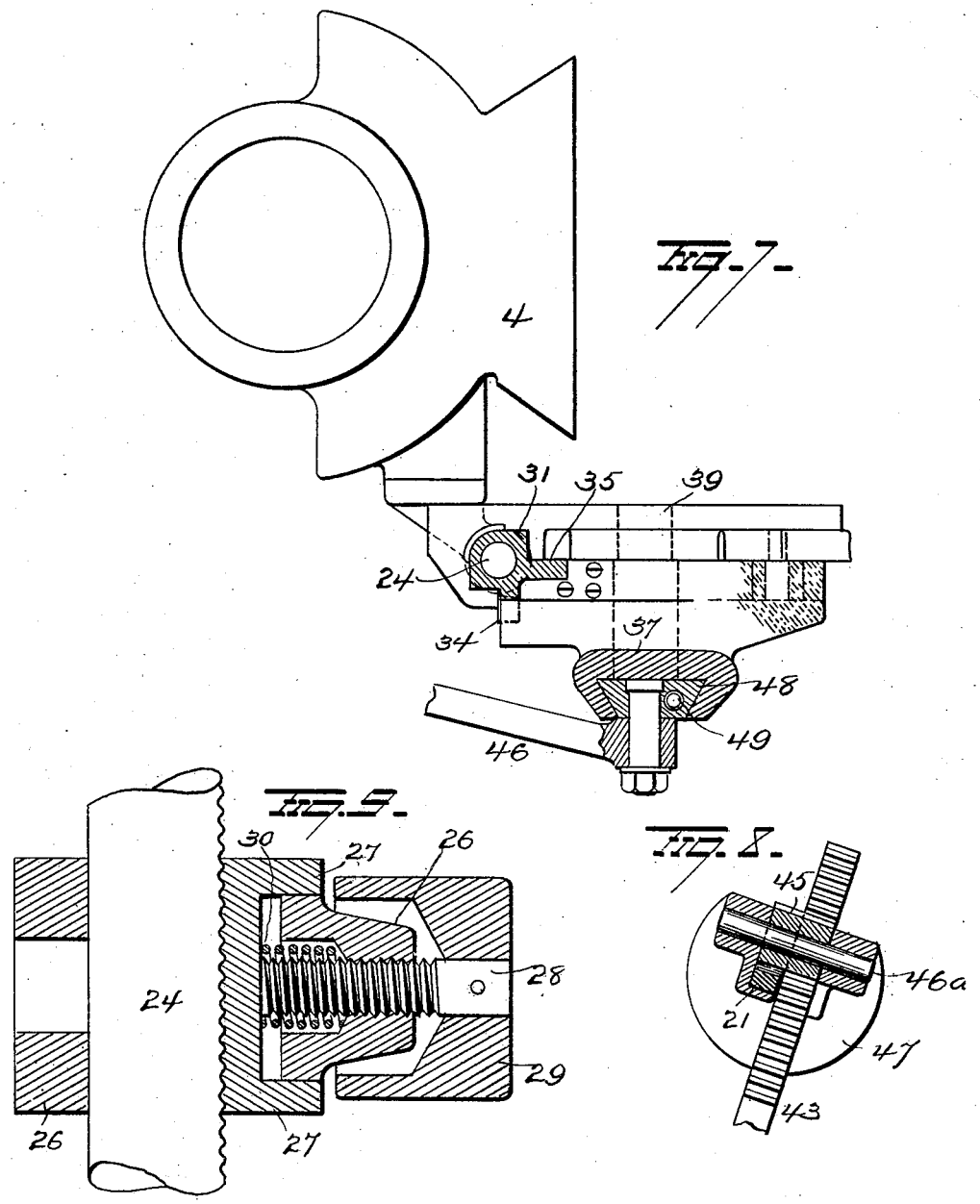

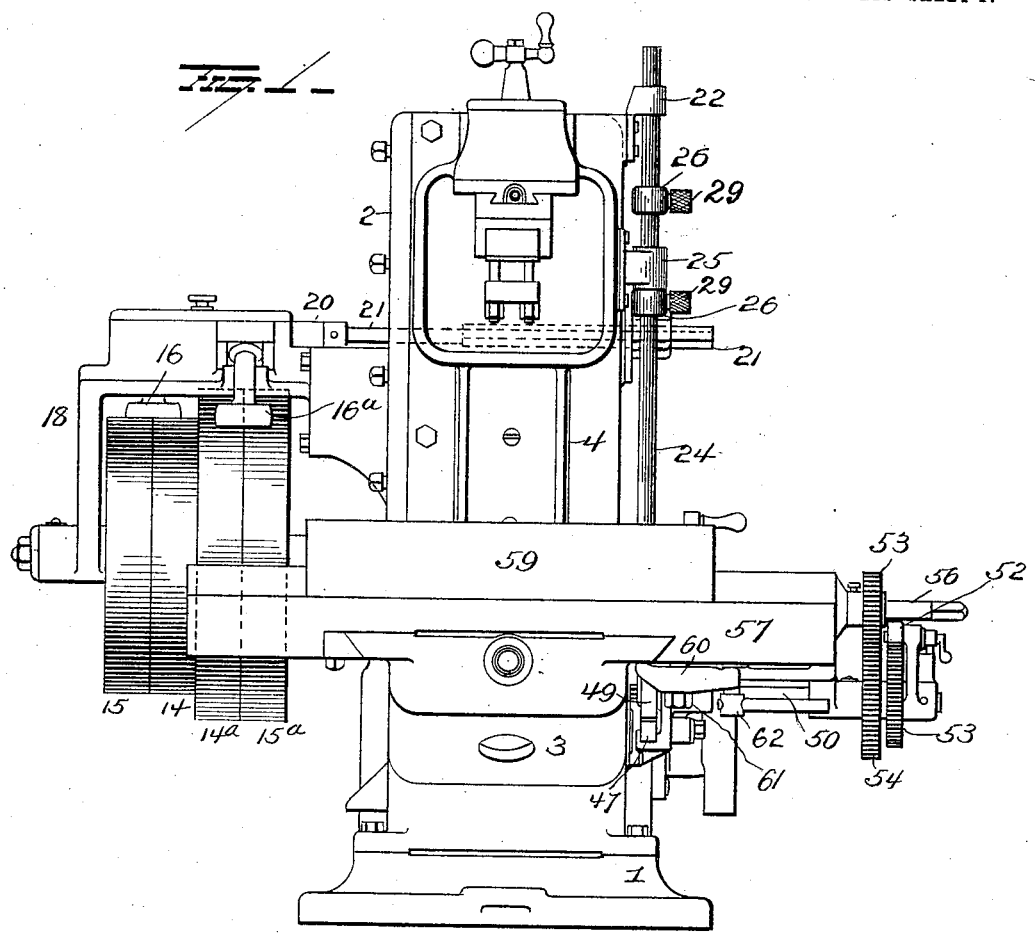

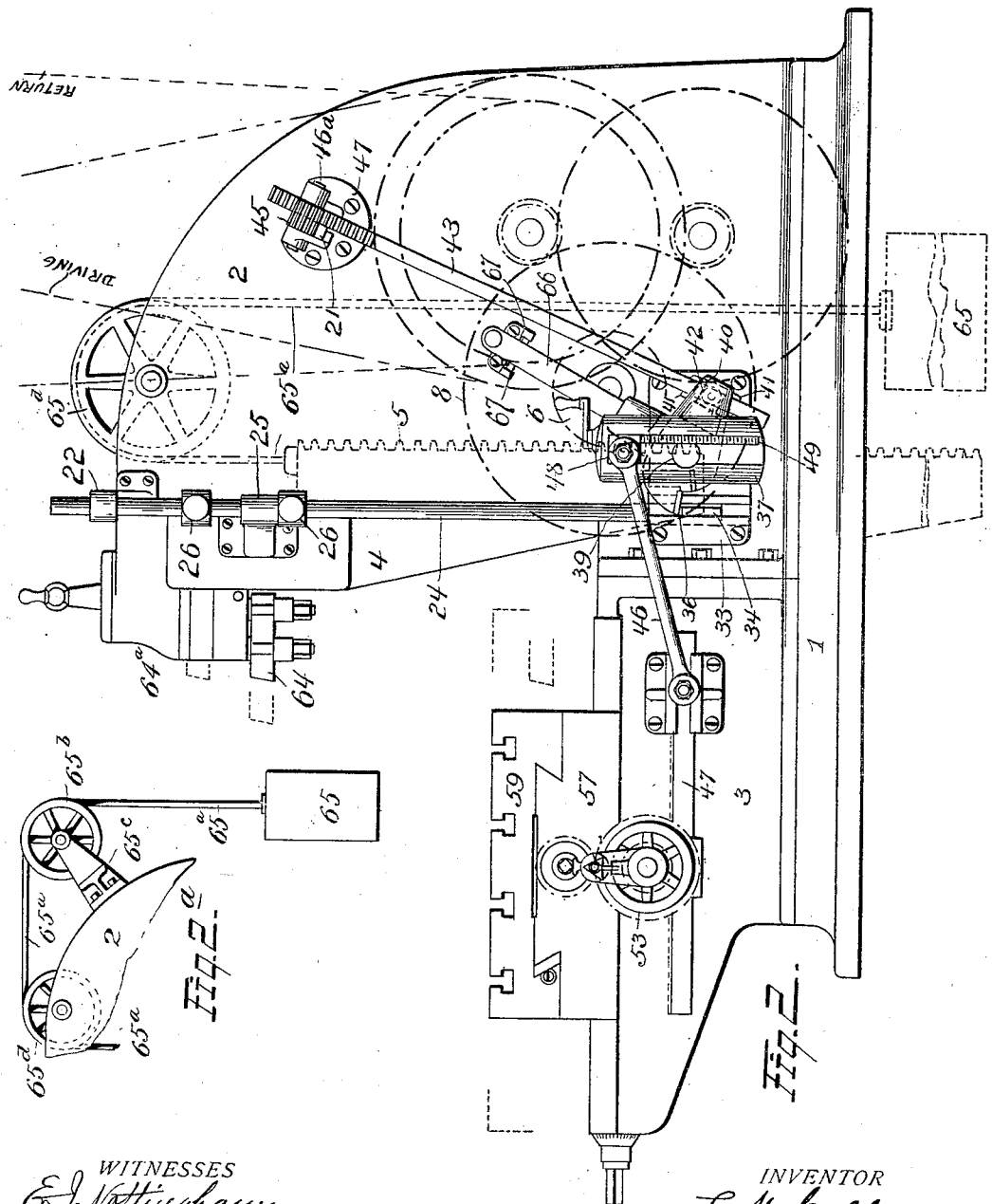

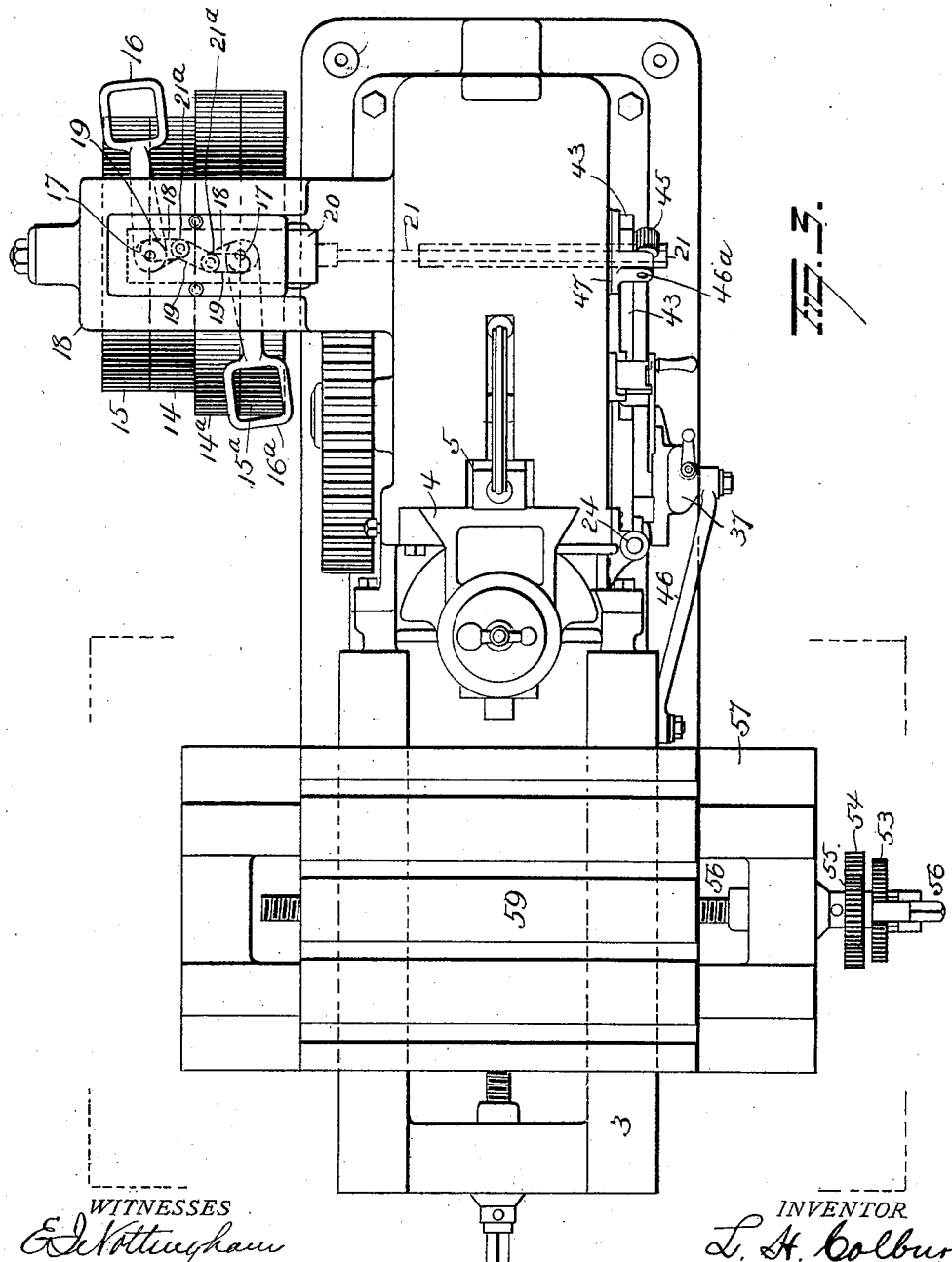

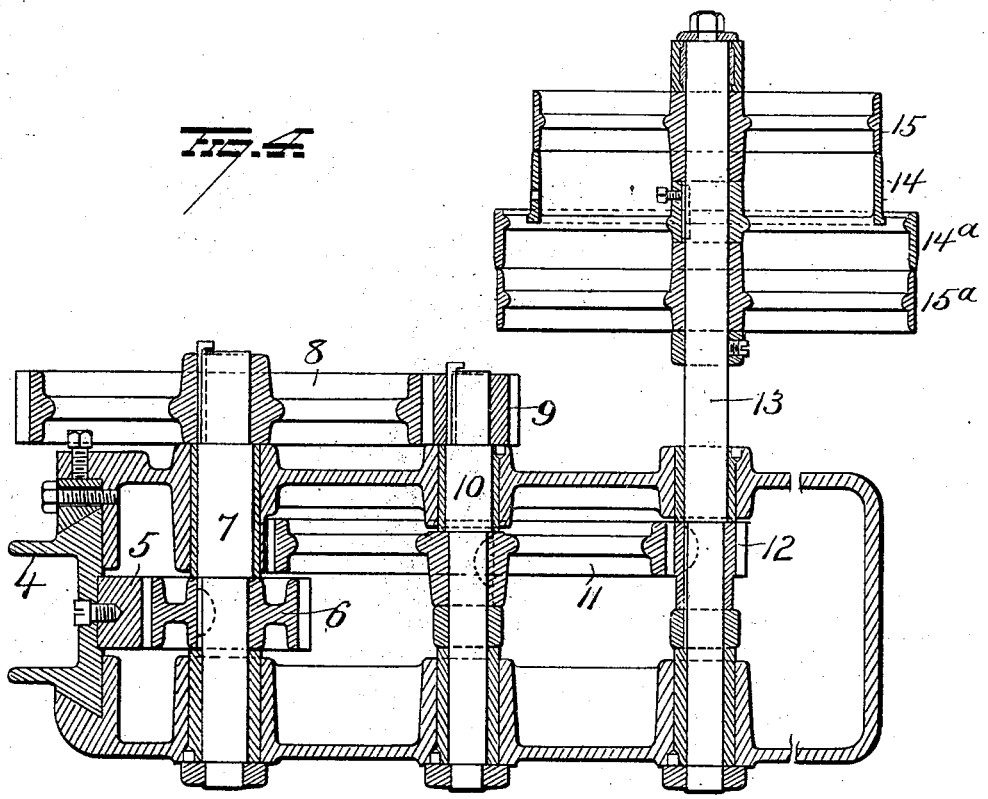

No. 755,849. Patented March 29, 1904.

UNITED STATES PATENT OFFICE.

LESLIE H. COLBURN, OF FRANKLIN, PENNSYLVANIA.

VERTICAL SHAPER.

SPECIFICATION forming part of Letters Patent No. 755,849, dated March 29, 1904.

Application filed July 29, 1902. Serial No. 117,549. (No model.)

*To all whom it may concern:*

Be it known that I, LESLIE H. COLBURN, of Franklin, in the county of Venango and State of Pennsylvania, have invented certain new and useful Improvements in Vertical Shapers; and I do hereby declare the following to be a full, clear, and exact description of the invention, such as will enable others skilled in the art to which it appertains to make and use the same.

My invention relates to an improvement in metal-working machines known to the trade as "shaping-machines," the principal object being to provide a construction capable of machining such work as cannot be readily handled on an ordinary planer or regular type of shaper; and it consists in the parts and combinations of parts, as will be more fully described, and pointed out in the claims.

In the accompanying drawings, Figure 1 is a view in front elevation of my improved machine. Fig. 2 is a view in side elevation of same. Fig. $2^a$ is a detail view of a slight modification. Fig. 3 is a view in plan. Fig. 4 is a horizontal sectional view through the main frame. Fig. 5 is a section through the saddle, table-bed, and clamp. Fig. 6 is a view in vertical section through the table. Fig. 7 is a view, partly in section, looking down on the rocker, showing its connection with the ram. Fig. 8 is a view in section through the pinion which actuates the shipper-rod. Fig. 9 is a view in section through the tripping-dog. Fig. 10 is a detached perspective view of the rocker, the tripping-rod, and rod for actuating the shipper-pinion and also showing the manner of mounting the lower end of the tripping-rod. Fig. 11 is a view in section on the line $a\,b$ of Fig. 10.

1 represents the base or bed of the machine, carrying the upright or vertical frame 2 and the table-supporting frame or bed 3, the frames 2 and 3 being bolted to each other and to the base 1.

4 represents the ram, mounted in frame 2, as shown in Figs. 3 and 4, and provided on its rear face with the rack 5, which may be integral with the ram or secured thereto, as deemed desirable. This rack 5 meshes with pinion 6 on shaft 7, mounted in the upright or vertical frame 2, and the shaft 7 carries the gear 8, which meshes with the pinion 9 on shaft 10. Shaft 10 is also journaled in frame 2 and carries the gear 11, which meshes with pinion 12 on the driving-shaft 13. The shafts 7, 10, and 13 all project at one side of the frame 2 and the gears 8 and 9 are located on the outside, while the shaft 13 carries the fast and loose belt-pulleys 14 and $14^a$ and 15 and $15^a$. Hence when motion is transmitted to shaft 13 it will be transmitted to the rack-bar and connected tool-post and reciprocate them vertically, the direction of movement being dependent, of course, on the direction of rotation of the shaft 13.

The two fast pulleys 14 and $14^a$ are located intermediate the loose pulleys 15 and $15^a$, and, as shown in Fig. 3, two belt-shifter arms 16 and $16^a$ are employed for shifting the two belts, one of which operates to drive the parts in one direction, while the other one drives the parts in the reverse direction. The larger pulley $14^a$ is the driving-pulley, while the smaller one is the return-pulley, and they are preferably so proportioned as to give the ram 4 a return speed in the ratio of about two and one-half to one.

The belt-shifting arms 16 and $16^a$ are bell crank in shape and are each pivoted at 17 to the driving-pulley bracket 18 or other suitable part of the machine. The longer member of each shifting-arm is provided with a loop or stirrup for embracing its belt, while the shorter arm 18 of each is provided at its free end with an antifriction-roller $21^a$, which rests and moves in the cam-slot 19 in the shifter cam-plate 20. The cam-slot 19 in the cam-plate 20 is made up of two straight end sections located slightly out of line and a central oblique section connecting the two end sections. The sections of the cam-slots and the shifting-levers are so located with relation to each other that when the antifriction-rollers $21^a$ are at the opposite extremes of the central or oblique section of the cam-slot, as shown in Fig. 3, both shifting-arms will be positioned over the loose pulleys and the machine will remain at rest. By sliding the cam-plate 20 in one direction, say, inwardly, or in a direction toward the vertical portion 2 of the frame of the machine, the antifriction-roller on the shifting-arm 16 will simply rest in the straight slot of the cam, and hence have no movement imparted to it, while the roller 21ª on the shifter-arm 16ª will be moved by the oblique section of the cam-slot, and thus shift the arm 16ª from a position over the loose pulley 15ª to a position over the fixed pulley 14ª, and thus impart the slow downward speed to the ram and tool-post. A reversal in the direction of movement of the shifting cam-plate 20 operates to first shift the arm 16ª back to a position over loose pulley 15ª and then shifts arm 16 to a position over fast pulley 14, thus imparting to the ram and tool-post a rapid upward or a return movement.

The cam-plate 20 is moved longitudinally by the sliding rod 21, which latter passes transversely through the upright frame 2 and is operated by mechanism to be hereinafter described.

Mounted in a bearing 22 at one side and adjacent to the front of the vertical portion 2 of the frame is the vertically-movable rod 24, and loosely embracing said rod 24 is the bracket 25, carried by the ram 4. Located on and adjustably clamped to the rod 24 above and below the bracket 25 are the tripping-dogs 26, the construction of which is fully shown in Fig. 9. Each dog 26 is provided with a bore considerably larger than the rod 24, so as to receive the shoe 27, having a toothed face adapted to engage corresponding teeth formed in the surface of the rod 24. A screw 28, having an inlarged head 29, is carried by the body of the dog and engages the shoe 27 and operates to clamp the latter in place, a spring 30 being also employed, if desired, for yieldingly holding the shoe against the rod when the pressure of the screw has been relieved. From this it is evident that the dogs can be adjusted up or down on rod 24, the lower one being so placed as to be engaged by the bracket 25 on the downstroke of the ram and, as will be hereinafter described, operate to reverse the direction of rotation of the actuating-gearing, while the upper one should be so placed as to be engaged when the cutting-tool reaches a position above the work.

Secured to the lower end of the rod 24 is the foot-piece 31. (Shown in Fig. 7 and also in Fig. 10.) This foot-piece conforms in shape to and is mounted to slide in a guideway 32 in the bracket 33, which latter is secured to the side of the vertical frame 2 near the base of the latter. This foot-piece is provided with an outwardly-projecting lug 34 and a rearwardly-projecting lug 35, the former of which is designed to engage the under face of the shoulder 36 of the rocker 37, while the lower face of lug 35 engages the upper face of shoulder 38 of said rocker. The rocker 37 is journaled on a stud 39, carried by the plate or bracket 33. Hence it is evident that as rod 24 is raised by the engagement of bracket 25 on ram 4 with the upper dog 26 that the rocker will by the engagement of lug 34 of foot-piece 31 with shoulder 36 be turned in one direction, whereas the engagement of lug 35 with shoulder 38 will rock the rocker in the reverse direction.

The rocker 37 is provided with a rearwardly and downwardly extending projection 40, provided on its rear or inner face with a groove 41, in which the roller 42 on rod 43 rests and moves. This rod 43 projects upwardly and rearwardly adjacent to the outer face of the vertical portion 2 of the frame and is retained against lateral displacement and guided at its lower end by the ribs 44 on bracket 33. The upper end of this rod 43 is provided with rack-teeth, which engage the teeth of pinion 45, mounted on the pintle 46ª, carried by the bracket 47, the latter being secured to the side of vertical portion 2 of the frame of the machine. The transverse rod 21, which, as before explained, actuates the cam-plate 20, is provided near its outer end with teeth, which also engage the teeth of pinion 45. Hence it follows that as the rocker 37 is rocked the rod 43 is moved longitudinally either up or down and operates, through its rack-teeth, to rotate pinion 45, and the latter in turn moves the transverse rod 21 longitudinally, which movement, as before explained, shifts the belt and reverses the direction of rotation of the actuating-gearing.

The table feed is operated from the rocker 37 through the medium of the connecting-rod or pitman 46, sliding rack 47, and gearing. (Shown in Figs. 2 and 6.)

Mounted in a central longitudinal dovetailed slot in the outer face of the rocker 37 is the sliding block 48. This sliding block engages or is mounted on the screw 49, carried by the rocker, and may be adjusted thereby, so as to change the length of the stroke of the rack 47. The farther away said block 48 is from the axis of the rocker the greater the throw, and by moving the block past the axis of the rocker and toward the opposite end of the latter the direction of the stroke of rack 47 will be reversed with relation to the up-and-down movements or position of the ram.

As the time at which the table feeds in relation to the stroke of the ram is important in a machine of this type, provision for regulating same is essential and is fully provided for in this machine. The connecting-rod or pitman 46 is, as before explained, connected to block 48, carried by the rocker, and is connected at its opposite or front end to the rack-bar 47. This rack-bar, as shown in Fig. 6, is suitably supported on bearings carried by the table-bed 3 of the machine and engages the teeth of pinion 49ª on shaft 50. This shaft 50 carries at its outer end a pawl-arm 51, carrying a pawl 52, which latter engages the teeth of ratchet-pinion 53, keyed to the hub of pinion 54, which latter is loosely mounted on shaft 50.

Pinion 54 meshes with pinion 55 on screw-shaft 56, journaled in the saddle 57 and engaging the nut 58, secured to the table 59. From this it is evident that as the screw is turned the table is moved, and as the movement is controlled by the ram their relative movements can by the mechanism described be timed to a nicety. The saddle is mounted to slide on the table bed or section 3 of the frame and may be adjusted by a screw operated by hand in the usual manner.

In order to prevent any accidental movement of the saddle on the table-bed 3, I provide the clamp. (Shown in Figs. 1 and 5.) This clamp 60 is loosely mounted on the stud 61, carried by the saddle 57, with its shorter end underlapping the flange of the table-bed 3, while its outer and longer end is slotted for the passage of the clamping-screw 62. This screw is mounted in the saddle 57 and is provided with a shoulder 63, which bears on the upper face of the clamp 60. Hence by turning the screw in a direction to force the shoulder 63 down onto the longer end of the clamp the shorter end or the latter operates to bind or lock the two parts 57 and 3 together. The ram is provided at its head or upper end with a tool-post 64$^a$ for a tool 64.

The ram is preferably counterbalanced by a weight 65, suspended within a pit below the frame of the machine by means of a cable 65$^a$, passing over a pulley 65$^d$, as shown in dotted lines in Fig. 2, or the weight-supporting cable 65$^a$ may be passed over a pulley 65$^b$, mounted in a bracket 65$^c$, secured to the rear portion of the frame 2. (See Fig. 2$^a$.)

A hand-lever 66 for starting and stopping the machine is attached to the rocker, (see Fig. 2,) whereby the latter may be moved by hand and the machine fully controlled at will of operator. Means 67 are also provided for locking the lever 66 when in its central position when it is desired to stop the ram without reversing the machine.

This machine is specially designed for machining such work as the edges of armor-plates, rolling-mill housings, cutting the gates and risers from steel castings, and such other work as cannot be handled on the ordinary planer, and is particularly adapted for machining pieces that have to be planed crosswise of their lengths. For instance, it may be necessary to machine crosswise a piece of work ten or fifteen feet in length. In order to do such work on a planer, it would require a machine having a space between the uprights equal to the length of the piece. Obviously it would be a difficult matter to find such a machine in ordinary shops; but on a vertical planer, such as I have described, such work could be readily handled. Again, it has long been recognized that a draw stroke is better for taking heavy cuts, especially in steel, than a push cut, such as with the ordinary shaper. In this machine I not only have a draw cut, but the ram has a vertical travel and the cut is taken on the downstroke, thus sustaining the thrust on the bed of the machine and eliminating all tendency for the work or other parts to spring.

It is evident that many slight changes might be resorted to in the relative arrangement of parts herein shown and described without departing from the spirit and scope of my invention. Hence I would have it understood that I do not wish to confine myself to the exact construction shown and described; but, Having fully described my invention, what I claim as new, and desire to secure by Letters Patent, is—

1. In a vertical shaper, the combination with a ram, a bracket thereon, a vertically-movable rod mounted adjacent to the ram, and a pair of stops adjustably secured to the rod and adapted to be alternately engaged by the bracket on the ram, of a rocker having two shoulders, a foot-piece on the end of the rod having lugs each engaging a shoulder on the rocker, and belt-shifting and table feeding devices connected to said rocker.

2. In a vertical shaper, the combination with a vertically-movable ram, a bracket carried thereby, a rod mounted adjacent to the ram, and a pair of stops on said rod, the said stops adapted to be alternately engaged by the bracket, of a rocker mounted on the frame of the machine and provided with two shoulders one facing up and the other down, a foot-piece carried by the rod and provided with two lugs one of which rests over the upwardly-facing shoulder of the rocker and the other below the downwardly-facing shoulder of the rocker, whereby they are caused by the reciprocating movement of the rod to alternately engage said shoulders and rock the rocker, and belt-shifting and table feeding devices connected to said rocker.

3. In a shaping-machine, the combination with a ram, gearing for operating the same and two pairs of fast and loose pulleys, of a belt-shifting arm for each pair of pulleys, a sliding cam-plate engaging both arms, a rod connected to said plate and provided at its outer end with teeth, a rocker, a rod connected to said rocker and provided with teeth, and a pinion engaging the teeth of both rods whereby when the rocker is rocked both belt-shifting arms will be moved.

4. In a shaping-machine, the combination with a ram, gearing for operating the same and two pairs of fast and loose pulleys, of a belt-shifting arm for each pair of pulleys, a sliding plate having a cam-groove engaged by both belt-shifting arms, a rod engaging the sliding plate and provided at its outer end with rack-teeth, a rocker, a rod connected at one end to said rocker and provided at its other end with rack-teeth, a pinion engaging the teeth of both rods and means for actuating the rocker.

5. The combination with a ram carrying a cutting-tool and a bracket, of a longitudinally-movable rod adjacent to the ram, stops adjustably secured on said rod and adapted to be alternately engaged by the bracket, a foot-piece secured to the end of said rod and provided with two lugs, a bracket having a bearing to receive said foot-piece, a rocker pivoted to said bracket and having shoulders engaged by the lugs on the foot-piece, and belt-shifting and table feeding devices connected to and actuated by said rocker.

In testimony whereof I have signed this specification in the presence of two subscribing witnesses.

LESLIE H. COLBURN.

Witnesses:
    H. W. BRECKENRIDGE,
    W. E. BARROW.